(12) United States Patent
Ramaswamy et al.

(10) Patent No.: US 10,891,971 B2
(45) Date of Patent: Jan. 12, 2021

(54) METHODS AND APPARATUS TO DYNAMICALLY GENERATE AUDIO SIGNATURES ADAPTIVE TO CIRCUMSTANCES ASSOCIATED WITH MEDIA BEING MONITORED

(71) Applicant: The Nielsen Company (US), LLC, New York, NY (US)

(72) Inventors: Arun Ramaswamy, Tampa, FL (US); Anand Jain, Ellicott City, MD (US); John Stavropoulos, Edison, NJ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 200 days.

(21) Appl. No.: 15/997,685

(22) Filed: Jun. 4, 2018

(65) Prior Publication Data

US 2019/0371357 A1 Dec. 5, 2019

(51) Int. Cl.
G10L 25/78 (2013.01)
H04N 21/442 (2011.01)
H04H 60/58 (2008.01)

(52) U.S. Cl.
CPC .............. *G10L 25/78* (2013.01); *H04H 60/58* (2013.01); *H04N 21/44218* (2013.01)

(58) Field of Classification Search
None
See application file for complete search history.

(56) References Cited

U.S. PATENT DOCUMENTS

| | | | |
|---|---|---|---|
| 5,612,729 A | 3/1997 | Ellis et al. | |
| 7,222,071 B2 | 5/2007 | Neuhauser et al. | |
| 7,359,006 B1 | 4/2008 | Xiang et al. | |
| 7,643,994 B2 | 1/2010 | Kemp | |
| 7,793,316 B2 | 9/2010 | Mears et al. | |
| 8,098,152 B2 | 1/2012 | Zhang et al. | |
| 8,572,640 B2 | 10/2013 | Kolessar | |
| 8,600,531 B2 | 12/2013 | Topchy et al. | |
| 8,725,829 B2 | 5/2014 | Wang et al. | |
| 8,948,895 B2 | 2/2015 | Weiss et al. | |

(Continued)

FOREIGN PATENT DOCUMENTS

WO 2014164369 10/2014

OTHER PUBLICATIONS

International Searching Authority, "International Search Report and Written Opinion", issued in connection with PCT patent application No. PCT/US2019/035212, dated Sep. 20, 2019 (11 pages).

*Primary Examiner* — Jonathan C Kim

(74) *Attorney, Agent, or Firm* — Hanley, Flight & Zimmerman, LLC

(57) ABSTRACT

Methods and apparatus to dynamically generate audio signatures adaptive to circumstances associated with media being monitored are disclosed. An example apparatus includes a signal selector to select a first signature scheme from among a plurality of signature schemes to generate monitored signatures for media being monitored by a meter. The first signature scheme is selected based on a circumstance associated with the media. The apparatus includes a signal generator to generate a first monitored signature from the media based on the first signature scheme. The apparatus further includes a communications interface to transmit the first monitored signature to a data collection facility.

19 Claims, 8 Drawing Sheets

(56) References Cited

U.S. PATENT DOCUMENTS

| | | |
|---|---|---|
| 9,124,379 B2 | 9/2015 | Lee |
| 9,294,813 B2 | 3/2016 | Lee |
| 9,374,629 B2 | 6/2016 | Lee |
| 9,576,197 B2 | 2/2017 | Lee |
| 9,662,578 B2 | 5/2017 | Zalewski |
| 9,698,924 B2 | 7/2017 | Kalampoukas et al. |
| 9,704,494 B2 | 7/2017 | Srinivasan et al. |
| 9,843,877 B2 | 12/2017 | Gonzales, Jr. |
| 10,089,994 B1* | 10/2018 | Radzishevsky ......... G10L 25/18 |
| 2003/0112265 A1* | 6/2003 | Zhang ................. G06F 16/745 |
| | | 715/723 |
| 2005/0043830 A1 | 2/2005 | Lee et al. |
| 2007/0052556 A1 | 3/2007 | Janssen et al. |
| 2007/0192087 A1* | 8/2007 | Kim .......................... G10L 25/48 |
| | | 704/200.1 |
| 2010/0274372 A1* | 10/2010 | Nielsen .................. H04H 60/32 |
| | | 700/94 |
| 2011/0088053 A1* | 4/2011 | Lee ........................ H04H 60/59 |
| | | 725/19 |
| 2012/0022864 A1 | 1/2012 | Leman et al. |
| 2012/0215789 A1* | 8/2012 | Ramanathan ....... G06K 9/4671 |
| | | 707/747 |
| 2012/0294459 A1* | 11/2012 | Chapman ............... G10H 3/186 |
| | | 381/98 |
| 2013/0014145 A1* | 1/2013 | Bhatia .................... H04H 60/31 |
| | | 725/13 |
| 2013/0251189 A1* | 9/2013 | McMillan ........ H04N 21/44204 |
| | | 382/100 |
| 2013/0318071 A1* | 11/2013 | Cho ....................... G06F 16/683 |
| | | 707/722 |
| 2014/0108441 A1* | 4/2014 | Samari ................... H04H 60/40 |
| | | 707/758 |
| 2014/0114659 A1 | 4/2014 | Sharifi et al. |
| 2014/0142958 A1* | 5/2014 | Sharma ................... G10L 19/02 |
| | | 704/500 |
| 2014/0254807 A1* | 9/2014 | Fonseca, Jr. ............. H04R 3/00 |
| | | 381/56 |
| 2015/0026177 A1 | 1/2015 | Raichelgauz et al. |
| 2015/0104023 A1* | 4/2015 | Bilobrov ............... H04R 29/00 |
| | | 381/56 |
| 2016/0148620 A1* | 5/2016 | Bilobrov ................ G10L 25/54 |
| | | 704/270 |
| 2016/0300579 A1* | 10/2016 | Bilobrov ................ G10L 25/51 |
| 2017/0358283 A1 | 12/2017 | Neuhauser et al. |
| 2018/0062778 A1 | 3/2018 | Kalampoukas et al. |
| 2018/0331757 A1* | 11/2018 | Breuer ................... H04B 10/40 |
| 2019/0371357 A1* | 12/2019 | Ramaswamy ..... H04N 21/6582 |
| 2019/0379931 A1* | 12/2019 | Stojancic ........... H04N 21/4394 |

\* cited by examiner

METHODS AND APPARATUS TO DYNAMICALLY GENERATE AUDIO SIGNATURES ADAPTIVE TO CIRCUMSTANCES ASSOCIATED WITH MEDIA BEING MONITORED

FIELD OF THE DISCLOSURE

This disclosure relates generally to media monitoring, and, more particularly, to methods and apparatus to dynamically generate audio signatures adaptive to circumstances associated with media being monitored.

BACKGROUND

Identifying media information and, more specifically, audio signals (e.g., information in audio streams) using signature matching techniques is well established. Signatures are also equivalently known, and frequently referred to, as fingerprints. Signature matching techniques are often used in television and radio audience measurement applications and are implemented using several methods for generating and matching signatures. For example, an audience measurement meter may generate signatures from media to which one or more audience members are exposed. The audience measurement meter may be a stationary meter that is setup to monitor the audio stream of a particular media presentation device (e.g., a television in the audience members' home) or may be a portable meter that is carried by an audience member to monitor exposure to media wherever the audience member goes. Signatures generated by an audience measurement meter are representative of the media, or lack thereof, monitored by the meter, and may be sent to a central data collection facility for analysis.

Separate from the audience measurement meter, a reference generator may generate reference signatures representative of known media programs from known media sources (e.g., television channel, radio station, etc. that are provided within a broadcast region). The reference signatures may be stored at a reference site where the reference generator is located and/or sent to a central data collection facility for storage. The central data collection facility may compare signatures reported from an audience measurement meter with reference signatures collected by one or more reference generators. When a signature generated by the audience measurement meter is found to match a particular reference signature, the known media program corresponding to the matching reference signature may be identified as the media to which the audience members associated with the audience measurement meter were exposed.

DETAILED DESCRIPTION

Examples disclosed herein enable the dynamic selection of a particular signature scheme or methodology to use for media being monitored from a plurality of available alternatives in substantially real time based on detected circumstances associated with the media. In some examples, the signature scheme may be selected based on characteristics or conditions of the environment in which the media is detected and/or based on characteristics of the media itself. For example, one signature scheme may be selected for use in relatively low noise environments, whereas a second, different signature scheme may be selected for use when relatively high levels of background noise are detected. Additionally or alternatively, one signature scheme may be selected when the media is determined to contain predominantly speech-based audio or other audio in relatively low frequency ranges, whereas a second, different scheme may be selected for media containing rich content and/or audio in relatively high frequency ranges, such as, for example, music. The dynamic selection of different signature schemes to be applied at any given moment based on the content of the media and/or the context in which it is being monitored enables the collection of signatures that are more reliable and likely to match with reference signatures, thereby increasing the accuracy of audience measurements based on the signature matching. While such accuracy can be achieved by collecting multiple signatures concurrently using multiple different signature schemes, examples disclosed herein achieve similar accuracy with greater processor efficiency by identifying and implementing a single particular signature scheme at any particular moment without implementing other signature schemes. In this manner, efficiency is increased by limiting the number of signature schemes used at any given moment to one while also maintaining a high probability of an eventual match with reference signatures. In other examples, more than one signature scheme, but fewer than all available signature schemes, may be used at a particular point in time.

Figure 1:
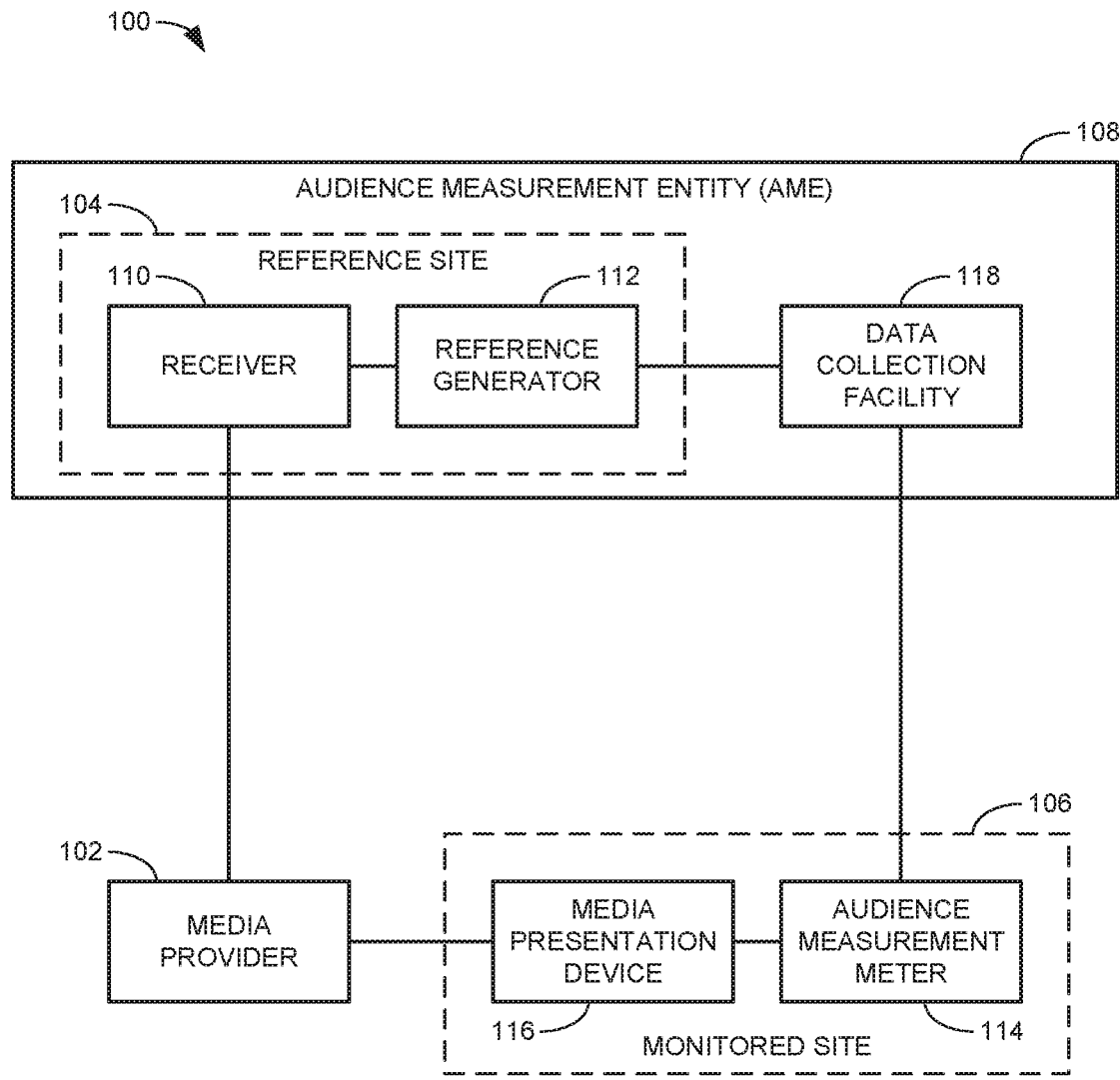
FIG. 1 is an example environment including an example audience measurement meter and an example data collection facility in accordance with teachings disclosed herein.

FIG. 1 is an example environment 100 in which teachings disclosed herein may be implemented. The environment 100 of FIG. 1 includes one or more media provider(s) 102 that provide media (e.g., television programming, on-demand media, Internet-based streaming media, advertisements, music, etc.) to one or more example reference sites 104 and one or more example monitored sites 106. As shown in the illustrated example, the reference site 104 is associated with and/or managed by an example audience measurement entity (AME) 108, such as The Nielsen Company (US), LLC, to collect reference media data for use in implementing various audience measurement endeavors.

In some examples, the reference site 104 includes an example receiver 110 (e.g., set-top boxes or the like) that receives media from the media provider 102 and transmits the media to an example reference generator 112 for processing. In the illustrated example, the receiver 110 is tuned to a known (e.g., designated by the AME 108) channel or station associated with the media provider 102. By designating the station or channel in this manner, the AME 108 can collect reference media data for the particular station or channel that can then be used to detect the media to which panelists are exposed (e.g., at the monitored site 106) to generate audience measurement metrics. As described more fully below, the reference media data may include reference signatures generated from the media received by the receiver 110. In some examples, the collected reference signatures may be stored locally at the reference site 104 along with the relevant media identifying information. Additionally or alternatively, the reference generator 112 may transmit the reference signatures and the associated media identifying information (collectively referred to as reference media data) to a central data collection facility 118 associated with the AME 108.

In some examples, the reference site 104 may include multiple receivers 110 tuned to different channels (associated with the same and/or different media provider(s) 102). In some such examples, each receiver may also have a corresponding reference generator 112. In other examples, a single reference generator 112 may collect and/or process the data from more than one receiver 110. Further, in some examples, there may be multiple media monitoring reference sites each with one or more receivers 110 and/or one or more reference generators 112. In some examples, the AME 108 may establish remote media monitoring sites at different geographic locations corresponding to regions where affiliated stations broadcast media for the region (e.g., local television programming, local radio programming, etc.). For purposes of clarity, in the illustrated example, one reference site 104 is shown containing one receiver 110 tuned to a particular station or channel associated with one media provider 102.

The AME 108 enlists panelists who consent to having the AME 108 collect audience measurement data from them that is indicative of the media to which the panelists are exposed. In the illustrated example, the monitored site 106 corresponds to a household of an audience member who has enrolled as a panelist in an audience measurement panel maintained by the AME 108. Thus, as shown in the illustrated example, the monitored site 106 includes an example audience measurement meter 114 provided by the AME 108 that monitors media from the media provider 102 that is played on an example media presentation device 116. The media presentation device 116 may be any type of media presentation device, such as a television, a computer, a smart phone, a tablet, a radio, etc. In some examples, the audience measurement meter 114 is integral (e.g., by way of software, firmware, and/or hardware) with the media presentation device 116. In other examples, the audience measurement meter 114 is implemented in a device separate from the media presentation device 116. In some examples, the audience measurement meter 114 is a people meter that is capable of detecting and/or otherwise tracking the presence of people in the environment surrounding the media presentation device 116 to properly credit or count individuals as audience members exposed to media playing on the device 116. Although the monitored site 106 is described above as corresponding to a panelist household, the monitored site may be any other location in which a panelist may be exposed to media. For instance, in some examples, the audience measurement meter 114 is a portable meter that is carried by a panelist such that the monitored site may be any location where a media presentation device is playing media (e.g., at a store, in a car, at a friend's house, etc.). Furthermore, although only one audience measurement meter 114 associated with one monitored site 106 is shown in the illustrated example, the AME 108 may collect data from multiple monitored sites 106 via multiple audience measurement meters 114.

Audience measurement data associated with audience member panelists can be collected through the use of watermarking and/or signatures. Watermarking is a technique used to identify media such as television broadcasts, radio broadcasts, advertisements (television and/or radio), downloaded media, streaming media, prepackaged media, etc. Watermarking includes audio watermarking and video watermarking. Existing audio watermarking techniques identify media by embedding one or more audio codes (e.g., one or more watermarks), such as media identifying information and/or an identifier that may be mapped to media identifying information (e.g., via a lookup in a media lineup table), into an audio component of a media signal. Video watermarking is analogous to audio watermarking, but the video watermark is placed in a video component of the media signal. In some examples, the audio or video component is selected to have a signal characteristic sufficient to hide the corresponding audio and/or video watermark. As used herein, the terms "code" or "watermark" are used interchangeably and are defined to mean any identification information (e.g., an identifier) that may be associated with media (e.g., a program or advertisement) for the purpose of identifying the media and/or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information. More particularly, in some examples, the audience measurement meter 114 detects and extracts watermarks embedded in monitored media and transmits the watermarks along with a timestamp to the data collection facility 118. The data collection facility 118 then processes the collected audience measurement data to identify the media indicated by the watermarks.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media. That is, while a single item of signature data may correspond to a fraction of a second of media (and, thus, unlikely sufficient to uniquely identify the media), as used herein a signature (or fingerprint) corresponds to a continuous stream of such individual items of signature data sufficiently long to identify the associated media relative to other media with a relatively high level of confidence. The particular length of such signatures may differ depending upon the nature of the media and/or the level of confidence desired.

Signature-based media monitoring generally involves determining (e.g., generating and/or collecting) signature(s)

representative of a media signal (e.g., an audio signal and/or a video signal) output by a monitored media device (e.g., the media presentation device 116 of FIG. 1) and comparing the monitored signature(s) to one or more reference signatures corresponding to known (e.g., reference) media sources. In the illustrated example, reference signatures are generated by the reference generator 112 processing the media received by the receiver 110. For purposes of explanation, signatures generated at a reference site 104 (e.g., by the reference generator 112) are referred to herein as reference signatures. By contrast, signatures generated at a monitored site 106 (e.g., by the audience measurement meter 114) are referred to herein as monitored signatures. The comparison of monitored and reference signatures may be implemented at the data collection facility 118 based on the data received from both the reference generator 112 and the audience measurement meter 114.

Various comparison criteria, such as a cross-correlation value, a Hamming distance, significant peaks comparison, etc., can be evaluated to determine whether a monitored signature matches a particular reference signature. When a match between the monitored signature and one of the reference signatures is found, the monitored media can be identified as corresponding to the particular reference media represented by the reference signature that is matched with the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were disclosed in Thomas, U.S. Pat. No. 5,481,294, which is hereby incorporated by reference in its entirety.

For monitored signatures to be compared with reference signatures, both sets of signatures need to be generated in a consistent manner. That is, unless the configurations of the respective signature techniques or schemes used to collect both the reference and monitored signatures are the same, the resulting signatures are unlikely to match even if they are generated from the same piece of media. There are many factors that go into the configuration of a given signature scheme including, for example, which frequency bands are analyzed, the number of bits used, the sampling frequency/rates, the duration of the sampling, etc. The ability for a given signature scheme with a given configuration to produce signatures from different instances of the same media that can be matched with a relatively high degree of confidence depends upon the circumstances associated with the media and its collection. The circumstances that impact the effectiveness or reliability of a given signature scheme include characteristics of the environment associated with the media being monitored and characteristics of the media itself.

For instance, the amount of background or ambient noise in the environment associated with the media being monitored can have a deleterious impact on some signature schemes while other signature schemes can tolerate the noise and capture reliable signatures. As another example, different signature schemes can have different levels of effectiveness based on characteristics of the media being monitored, such as the type of content contained in the media (e.g., the genre). For example, a relatively low frequency signature scheme may be good at generating signatures from media with an audio stream primarily containing speech (e.g., a talk show, a news show, etc.) because speech-based audio typically exhibits most of its signal energy at relatively low frequencies (e.g., around 1 kHz). However, the same signature scheme may not be as effective at generating reliable signatures from media containing rich content, such as music, with audio spreading across a wide frequency spectrum and/or that exhibits most of its signal energy at relatively high frequencies (e.g., above 3 or 4 kHz). Conversely, a different signature scheme configured to focus on higher frequency bands may be able to generate signatures from music that can be more reliably repeated than a relatively low frequency signature scheme that may be more suitable for speech.

As the circumstances associated with media to be monitored can change over time (either due to a change in content or due to a change in environmental circumstances), there may be no single configuration for a given signature scheme that provides reliable results in every situation. One approach to solve this issue involves implementing a signature scheme configured based on tradeoffs or compromises between the advantages and disadvantages of different types of signature schemes tailored to different circumstances. While this one-size-fits-all approach may enable the collection of signatures that are reliable in many situations, there may be times when, due to particular circumstances, generated signatures will not be as reliable as desired. Additionally, implementing a one-size-fits-all signature scheme may also result in more processing of data than is actually needed to reliably produce signatures. For example, the one-size-fits-all signature scheme may include a relatively large payload to enable an analysis of the media on the assumption that there will be some level of background noise. However, if there is little or no background noise in a particular circumstance, this extra payload unnecessarily increases the processing requirements of the system implementing the signature scheme. Furthermore, larger payloads also increase bandwidth requirements when the resulting signatures are transmitted to the data collection facility 118. Another approach to handle different circumstances of monitored media involves the concurrent implementation of multiple signatures schemes individually tailored to the different circumstances expected for the media being monitored. While this would enable more reliable signatures to be generated based on the particular circumstance of the media, the processing requirements and bandwidth to implement such a system increases with each additional signature scheme included in the system.

In the illustrated example, the audience measurement meter 114 overcomes the above obstacles by detecting circumstances associated with the media to be monitored and then selecting a suitable signature scheme from a plurality of available signature schemes that is adapted or tailored to the detected circumstances. In some examples, the audience measurement meter 114 detects the circumstances associated with the media by characterizing the media based on detected characteristics of the media. In some examples, the identification of such characteristics is used to identify the genre and/or type of content of the media (e.g., whether the media contains relatively sparse audio with intermittent gaps, such as speech, or contains relatively rich content, such as music). In some examples, the audience measurement meter 114 may further detect the nature of the environment in which the media is being monitored by, for example, detecting an amount of background noise. Based on the characterization of the media and the associated environment, the audience measurement meter 114 may select a particular signature scheme adapted to the detected content of the media. In some examples, the particular signature scheme is dynamically changed in substantially real-time as changes in the circumstances associated with the media are detected. In this manner, a signature scheme that is adapted to the current circumstances of media being monitored is used to generate signatures, thereby increasing the likelihood that the resulting monitored signatures will reliably match with corresponding reference signatures while improving efficiency by using only one signature scheme at any given time that is tailored to have a payload that is no greater than necessary. Thus, in some examples, when one signature scheme is selected for implementation in connection with a particular circumstance, other available signature schemes are not used.

As mentioned above, for a reliable match to be found between a monitored signature and a reference signature, both signatures need to be generated using consistent signature schemes. In some examples, the reference generator 112 may dynamically adapt the signature scheme used to generate reference signatures in a similar manner to the audience measurement meter 114 so that both the reference generator 112 and the audience measurement meter 114 are using the same scheme under the same circumstances. While this approach may work for circumstances based on the characteristics or content of the media, the reference generator 112 may be unable to determine the environmental conditions associated with the media monitored by the audience measurement meter 114. Accordingly, in some examples, the reference generator 112 concurrently implements multiple signature schemes according to the different environmental conditions anticipated for the audience measurement meter 114. In some examples, the reference generator 112 implements all pre-defined signature scheme concurrently to generate reference signatures for each available (pre-defined) signature scheme. For example, the reference generator 112 may implement a first signature scheme that is specifically adapted to a low noise environment (e.g., noise below a threshold level) and separately implement a second signature scheme that is adapted to a high noise environment (e.g., noise above a threshold level). The signatures collected using each different signature scheme may be stored in separate reference libraries or databases and/or otherwise catalogues for future reference. In this manner, regardless of whether the environment associated with media monitored by the audience measurement meter 114 is above or below the noise threshold (thereby changing the signature scheme used to generate monitored signatures), the reference generator 112 will collect suitable reference signatures for comparison to the monitored signatures.

Although the reference generator 112 may dynamically select signature schemes based on the characteristics of the media (e.g., speech versus music) as mentioned above, the reference generator 112 may nevertheless implement separate signature schemes for each different type (or characteristic) of media expected so that a complete database of reference signatures corresponding to each signature scheme may be created. In this manner, there is little risk that a monitored signature reported by the audience measurement meter 114 will not match with a corresponding reference signature in at least one of the scheme-specific databases.

Figure 2:
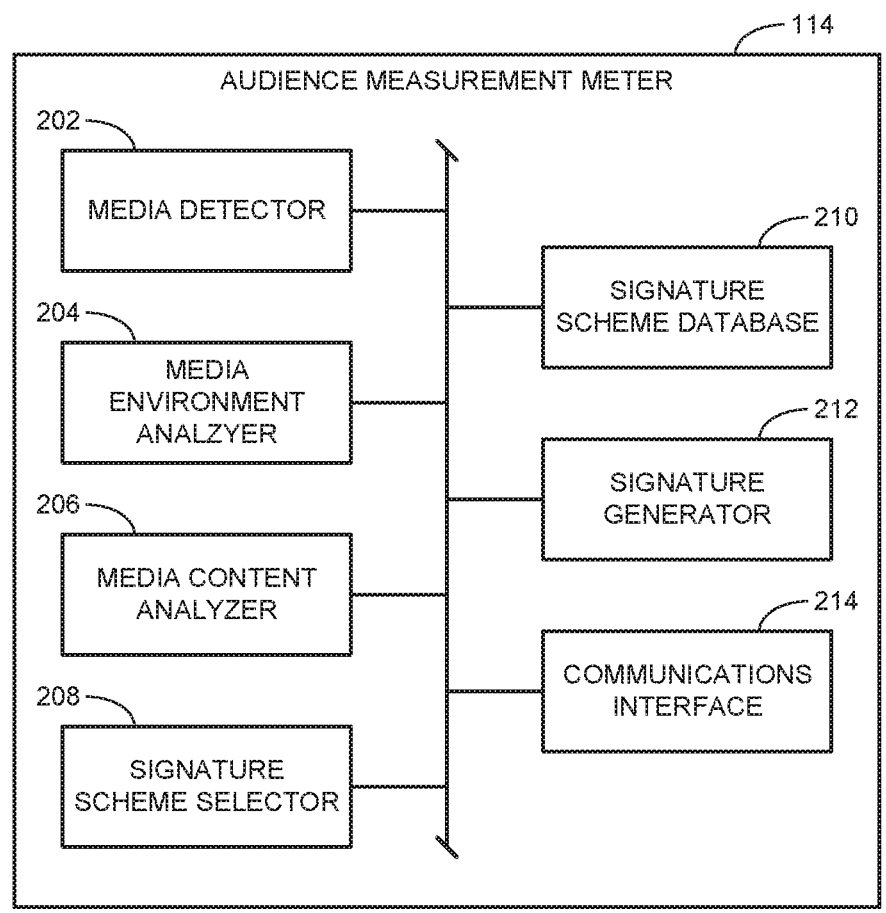
FIG. 2 is a block diagram illustrating an example implementation of the audience measurement meter of FIG. 1.

FIG. 2 is a block diagram illustrating an example implementation of the audience measurement meter 114 of FIG. 1. As shown in the illustrated example of FIG. 2, the audience measurement meter 114 includes an example media detector 202, an example media environment analyzer 204, an example media content analyzer 206, an example signature scheme selector 208, an example signature scheme database 210, an example signature generator 212, and an example communications interface 214.

The example media detector 202 of FIG. 2 enables the audience measurement meter 114 to detect and/or monitor media. In some examples, the media detector 202 monitors an audio stream of media. In such examples, the media detector 202 includes or is otherwise associated with an audio sensor such as, for example, a microphone, an audio input connection, etc. Additionally or alternatively, in some examples, the media detector 202 may be a video stream of the media and, as such, includes or is otherwise associated with a video sensor, such as, for example, a camera, a video input connection, etc.

In some examples, the media detector 202 may detect ambient noise unrelated to the audio stream and/or video stream of media to be monitored. Accordingly, in some examples, the audience measurement meter 114 is provided with the example media environment analyzer 204 to analyze the media detected by the media detector 202 to determine the circumstances associated with the environment in which the media is detected, including whether there is background noise and/or the amount of background noise. In some examples, the media environment analyzer 204 determines the amount of noise based on watermarks detected in the media. In some examples, the media content analyzer 206 detects and/or extracts such watermarks from the media. As described above, watermarks include media identifying information that is encoded into the media that is received at a media presentation device (e.g., the media presentation device 116). As the nature of the watermarks are known in advance, the detection of the watermarks relative to all audio that is detected in a particular environment may be analyzed to calculate the signal to noise ratio for the media relatively accurately. By analyzing the signal to noise ratio over time, the amount of background noise to the audio stream of the media may be quantified. In some instances, media being monitored may not have watermarks embedded therein. In such examples, the media environment analyzer 204 may use any other suitable methodology to estimate the presence and/or amount of background noise. While some such approaches may not be as deterministic or reliable as when the analysis is based on watermarks, such approaches are likely to distinguish between a relatively high background noise environment (e.g., noise above a noise threshold) and a relatively low background noise environment (e.g., noise below the noise threshold) under most circumstances. In some examples, analysis of signals that contain watermarks may be used as input to machine learning models implemented to predict the amount of background noise associated with signals that do not include watermarks.

In some examples, the media environment analyzer 204 may also process the audio detected by the media detector 202 for further analysis. In particular, in some examples, when a high noise environment (e.g., background noise that exceeds a noise threshold) is detected based on watermarks, the media environment analyzer 204 may process the audio, based on the detected watermarks, to filter out at least some of the background noise to isolate the audio stream of the media. In some examples, the media environment analyzer 204 may perform similar processes on a video stream detected by the media detector 202.

In the illustrated example of FIG. 2, the audience measurement meter 114 is provided with the example media content analyzer 206 to detect circumstances associated with the media detected by the media detector 202. More particularly, the circumstances associated with the media detected by the media content analyzer 206 pertain to the content of the media. Thus, the media environment analyzer 204 and the media content analyzer 206 collectively operate to determine the circumstances associated with the media, with the media environment analyzer 204 detecting characteristics of the environment of the media while the media content analyzer 206 detects characteristics of the media itself. In some examples, the characteristics of the media detected by the media content analyzer 206 are used to characterize the media by determining the genre or type of media detected. For example, the media content analyzer 206 may characterize particular media as primarily speech-based or primarily music-based. In some examples, this determination is based on where on the frequency spectrum a majority of the signal energy is located. In other examples, the characteristics of the media identified by media content analyzer 206 may be more generic to characterize the media without specifically identifying the genre or type of media detected. For example, the media content analyzer 206 may characterize the media directly based on where on the frequency spectrum a majority of the signal energy is located (e.g., skewed to a relatively low frequency band (e.g., around 1 kHz) or to a relatively high frequency band (e.g., above 3 or 4 kHz)). Additionally or alternatively, the media content analyzer 206 may determine how widespread the energy signal is on the frequency spectrum (e.g., the spectral frequency density). In some examples, other characteristics of the media may also be identified such as, for example, the timing, amount, and/or amplitude of peaks in the media signal.

In some examples, the media content analyzer 206 analyzes the media to detect or extract watermarks embedded in the media. Such watermarks may be used to identify the media and, thus, determine the genre and/or type of media detected, and/or other known characteristics of the media. Additionally or alternatively, such watermarks may be used to identify a baseline from which the media environment analyzer 204 may calculate the amount of background noise as described above.

The example signature scheme selector 208 of FIG. 2 selects one of multiple different signature schemes available for implementation to generate signatures from the monitored media. In the illustrated example, the different signature schemes are made available for selection by the signature scheme selector 208 by storing machine readable instructions associated with the different signatures, along with the relevant configuration parameters, in the signature scheme database 210.

In some examples, the different signature schemes are configured or otherwise customized to achieve a desired quality and/or improve the quality (e.g., reliability, uniqueness, repeatability, etc.) of signatures of the media being monitored depending on the circumstances associated with the media. That is, different signature schemes may be configured or otherwise customized to achieve a desired quality and/or improve (e.g., optimize) the collection of signatures from different types of media (e.g., speech versus music) and/or under different environmental conditions (e.g., low background noise versus high background noise).

For example, a first signature scheme may be specifically adapted or otherwise customized to generate signatures from media with audio signal energy predominately in relatively low frequency bands (often associated with speech content) while a second signature scheme may be specifically adapted or otherwise customized to generate signatures from media with audio signal energy predominately in relatively high frequency bands (often associated with music). In some examples, whether media is characterized as low frequency media or high frequency media may be defined by a particular frequency threshold defining the boundary between the low and high frequency bands. In some examples, the frequency band for low frequency signals may be defined independent of the frequency band for high frequency signals. In some examples, there may be additional signature schemes specifically adapted or otherwise customized to intermediate frequency bands between high and low bands. In some examples, the frequency bands to which the different signature schemes are focused may be mutually exclusive without any overlap. In other examples, different ones of the signature schemes may have overlapping frequency bands. In some examples, a first signature scheme may be adapted or otherwise customized to focus on a relatively narrow frequency band while a second signature scheme is adapted or otherwise customized to generate signatures from media with audio signals spread across a relatively wide frequency band.

While the above examples of different signature schemes are defined with respect to their associated frequency bands of interest, other signature schemes may be configured based on other aspects of the media in addition to or instead of frequency. For example, some signature schemes may also consider peaks in the monitored signal relative to changes in frequency band. As another example, signature schemes may be based on differences in time domain rather than the frequency domain. Additionally or alternatively, some signature schemes may be adapted to enhance (e.g., optimize) signature generation when there is a relatively high level of background noise while other signature schemes are adapted for low levels of background noise. For example, signature schemes for relatively high noise environments may include higher sampling rates and/or samples extending for longer durations than signature schemes used in a relatively low noise environment. In some examples, whether the media environment is characterized as containing high or low levels of noise may be defined by a particular noise threshold demarcating the different circumstances. In some examples, there may be additional signature schemes specifically adapted to intermediate levels of noise. That is, different signature schemes may be selected based on whether different noise thresholds are exceeded.

In some examples, different signature schemes may be based on a combination of multiple factors outlined above in a manner that tailors the different signature schemes to different circumstances. As a one example, four different signature schemes may include (1) a low frequency media content, low noise signature scheme, (2) a low frequency media content, high noise signature scheme, (3) a high frequency media content, low noise signature scheme, and (4) a high frequency media content, high noise signature scheme. In such examples, the signature scheme selector 208 selects a particular one of the signature schemes based on the current circumstances of the media being monitored (characteristics of the media and/or the associated environment) as determined by the media environment analyzer 204 and/or the media content analyzer 206. In some examples, the signature scheme selector 208 may dynamically change the selected signature scheme in substantially real time to adapt to changes in the media content and/or environment. For example, if the media is music on a radio, the signature scheme selector 208 may select a relatively high frequency signature scheme that is adapted to the typical frequency ranges expected for music and then switch to a lower frequency signature scheme more fitting for speech when the audio stream switches to a speech-based advertisement.

Further, the signature scheme selector 208 may select signature schemes adapted to relatively high noise environments when such environments are detected (e.g., in a vehicle or where there is a crowd of people making noise in addition to the media) and switch to other signature schemes when little or no background noise is detected (e.g., in the privacy of an audience member's home).

While frequency bands and noise (or any other factor(s)) may be combined to select a particular signature scheme at any given moment, in other examples, signature schemes may be tailored to a single factor independent of the others. For example, three different signature schemes may include (1) a low frequency signature scheme, (2) a high frequency signature scheme, and (3) a high noise signature scheme. In this example, when the media environment analyzer 204 detects a low noise environment (e.g., noise levels are below a noise threshold), the signature scheme selector 208 selects either the low frequency signature scheme or the high frequency signature scheme depending on the content of the media as determined by the media content analyzer 206. However, if the media environment analyzer 204 determines that the noise level exceeds a noise threshold, the signature scheme selector 208 selects the high noise signature scheme regardless of the characteristics of the media.

The example signature generator 212 uses whichever signature scheme is selected by the signature scheme selector 208 to generate signatures of the media being monitored. Because the signature scheme being applied at any given moment is selected based on the circumstances of the media (e.g., content characteristics and/or environmental conditions), it is likely that the signatures will be reliable to match against reference signatures generated by the reference generator 112 using the same signature scheme. Such a match is possible because the reference generator 112 of FIG. 1 generates signatures based on each of the signature schemes available to the audience measurement meter 114 (e.g., stored in the signature scheme database 210). In some examples, the reference generator 112 implements all of the signature schemes concurrently to generate a complete library of reference signatures for the relevant media using each of the signature schemes. Unlike the reference generator 112, in some examples, the example signature generator 212 of FIG. 2 implements only one signature scheme at any given time without implementing other signature schemes that may be available in the signature scheme database 210. This can significantly improve the processor efficiencies of the audience measurement meter because such an approach enables the capture of reliable signatures under virtually any circumstance while eliminating the need to implement multiple different signature schemes concurrently.

In some examples, the signature generator 212 also generates metadata for each signature generated. The metadata includes a scheme identifier that indicates the particular signature scheme used to generate the corresponding signature. In some examples, the scheme identifier includes, for example, a numeric identifier to identify the selected signature scheme or algorithm, a second numeric identifier to identify a particular configuration of the selected signature algorithm, etc. Both the signature and the scheme identifier generated by the signature generator 212 (collectively referred to as audience measurement data) may be transmitted, via the communications interface 214, to the data collection facility 118 of FIG. 1 for further processing. In some such examples, as described more fully below, the data collection facility 118 uses the scheme identifier to determine the appropriate library of reference signatures with which to compare the reported signature.

While an example manner of implementing the example audience measurement meter 114 of FIG. 1 is illustrated in FIG. 2, one or more of the elements, processes and/or devices illustrated in FIG. 2 may be combined, divided, re-arranged, omitted, eliminated and/or implemented in any other way. Further, the example media detector 202, the example media environment analyzer 204, the example media content analyzer 206, the example signature scheme selector 208, the example signature scheme database 210, the example signature generator 212, the example communications interface 214 and/or, more generally, the example audience measurement meter 114 of FIG. 2 may be implemented by hardware, software, firmware and/or any combination of hardware, software and/or firmware. Thus, for example, any of the example media detector 202, the example media environment analyzer 204, the example media content analyzer 206, the example signature scheme selector 208, the example signature scheme database 210, the example signature generator 212, the example communications interface 214 and/or, more generally, the example audience measurement meter 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media detector 202, the example media environment analyzer 204, the example media content analyzer 206, the example signature scheme selector 208, the example signature scheme database 210, the example signature generator 212, and/or the example communications interface 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement meter 114 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
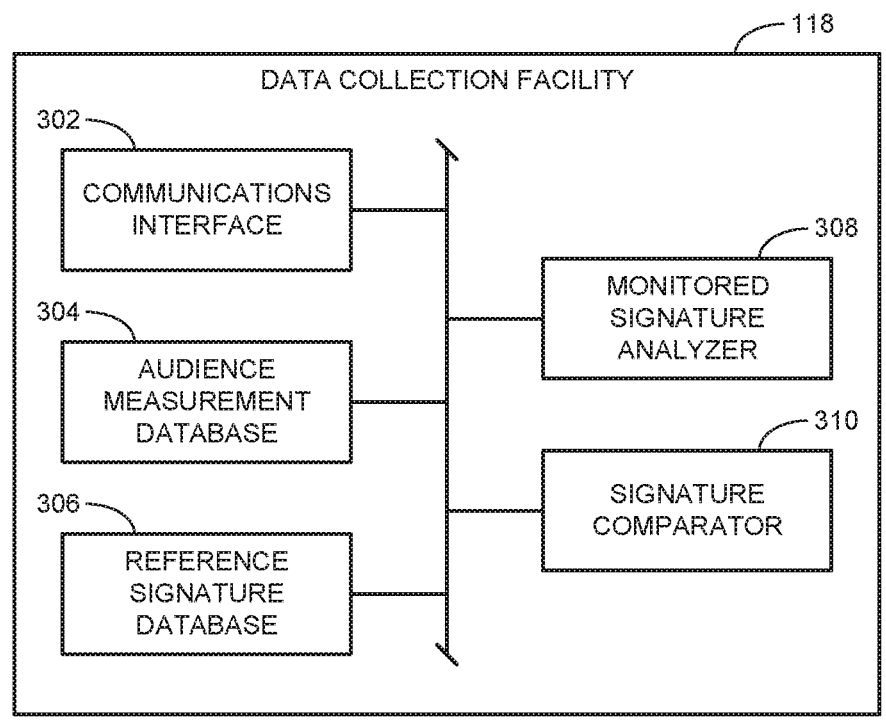
FIG. 3 is a block diagram illustrating an example implementation of the data collection facility of FIG. 1.

FIG. 3 is a block diagram illustrating an example implementation of the data collection facility 118 of FIG. 1. As shown in the illustrated example of FIG. 3, the data collection facility 118 includes an example communications interface 302, an example audience measurement database 304, an example reference signature database 306, an example monitored signature analyzer 308, and an example signature comparator 310.

In the illustrated example, the communications interface 302 receives audience measurement data, including monitored signatures and associated scheme identifiers, as reported from various audience measurement meters (e.g., the audience measurement meter 114). Such audience measurement data may be stored in the audience measurement database 304. Additionally, in some examples, the communications interface 302 receives reference media data, including reference signatures and associated media identifying information, collected from various reference generators (e.g., the reference generator 112). In some examples, the reference generator 112 may provide scheme identifiers similar to the audience measurement meter 114 to designate the particular signature scheme used to generate each reported reference signature. In other examples, scheme identifiers are not collected with the reference signatures because the reference generator 112 does not switch between different signature schemes but continuously reports signatures generated based on each relevant scheme. With the transmission of reference signatures dedicated to a particular signature scheme, the data collection facility 118 may be enabled to properly associate the reference signatures with the relevant signature scheme without needing to collect a scheme identifier.

As mentioned above, the reference generator 112 may transmit media identifying information along with the reported reference signatures. The media identifying information is associated with the reference signatures to enable the identification of the media from which the reference signatures were created. In some examples, the reference signatures and the associated media identifying information obtained from the reference generator 112 are stored in the reference signature database 306. In some examples, the reference signatures are grouped or organized into separate libraries of reference signatures associated with each different signature scheme used to collect the signatures. In some examples, each type of reference signature (e.g., based on a different signature scheme) may be stored in a separate database. In some examples, the reference signature database 306 is implemented with a distributed computing architecture that includes clusters of nodes. In some such examples, each different scheme may be associated with a separate cluster of nodes. Additionally or alternatively, as represented in FIG. 3, the reference signatures may be stored in a single database but distinguished based on a tag or identifier stored in connection with each type of reference signature.

In the illustrated example, the monitored signature analyzer 308 analyzes the monitored signatures and associated scheme identifiers reported from the audience measurement meter 114 for subsequent processing. For example, the monitored signature analyzer 308 identifies the particular signature scheme used to generate the signature based on the associated scheme identifier. Based on this information, the example signature comparator 310 compares the monitored signatures to the corresponding library of reference signatures associated with the same signature scheme. In some examples, monitored signatures may not include scheme identifiers and/or the data collection facility 118 may not use the scheme identifiers. In such examples, the monitored signature analyzer 308 compares the monitored signatures against the various different types of reference signatures to identify the best match. Once a match is identified, the example monitored signature analyzer 308 associates the monitored signature to the media identifying information corresponding to the matching reference signature. In this manner, the AME 108 is able to determine the media to which an audience member associated with the audience measurement meter 114 was exposed.

While an example manner of implementing the example data collection facility 118 of FIG. 1 is illustrated in FIG. 3, one or more of the elements, processes and/or devices illustrated in FIG. 3 may be combined, divided, re-arranged, omitted, eliminated and/or implemented in any other way. Further, the example communications interface 302, the example audience measurement database 304, the example reference signature database 306, the example monitored signature analyzer 308, the example signature comparator 310 and/or, more generally, the example data collection facility 118 of FIG. 3 may be implemented by hardware, software, firmware and/or any combination of hardware, software and/or firmware. Thus, for example, any of the example communications interface 302, the example audience measurement database 304, the example reference signature database 306, the example monitored signature analyzer 308, the example signature comparator 310 and/or, more generally, the example data collection facility 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 302, the example audience measurement database 304, the example reference signature database 306, the example monitored signature analyzer 308, and/or the example signature comparator 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data collection facility 118 of FIG. 1 may include one or more elements, processes and/or devices in addition to, or instead of, those illustrated in FIG. 3, and/or may include more than one of any or all of the illustrated elements, processes and devices.

Figure 4:
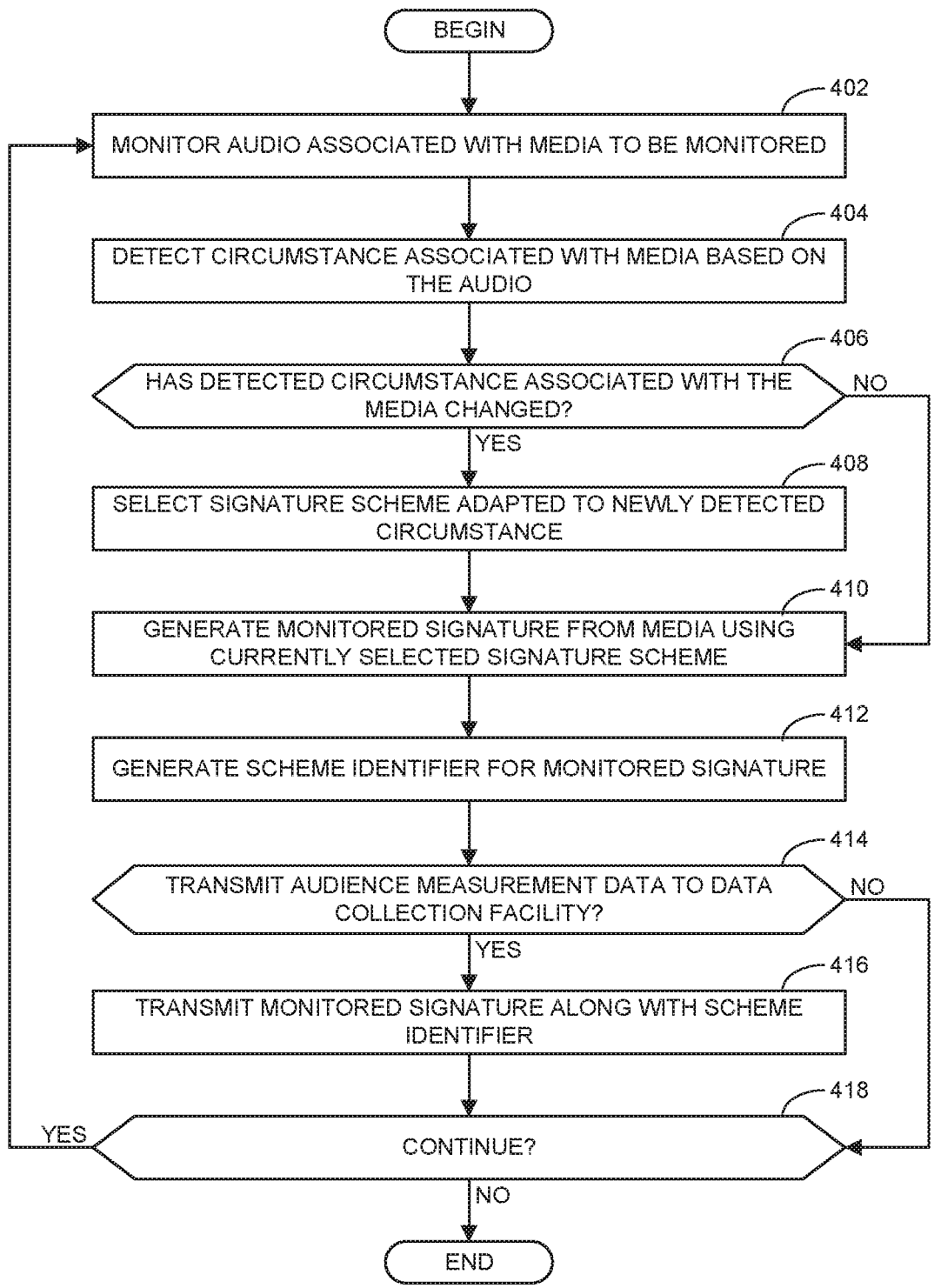
FIGS. 4 and 5 are flowcharts representative of example machine readable instructions that may be executed to implement the audience measurement meter of FIGS. 1 and/or 2.
Figure 5:
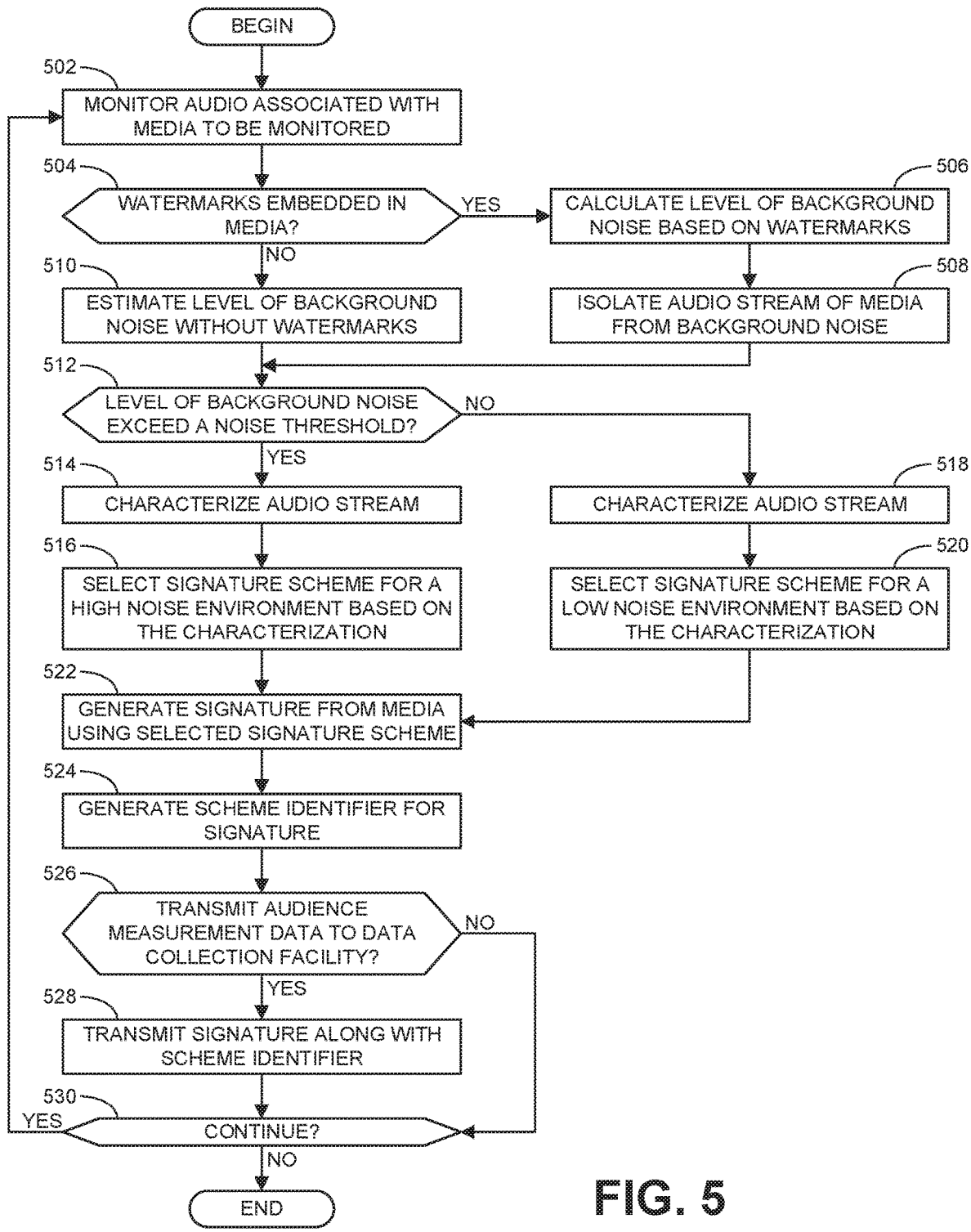
Figure 6:
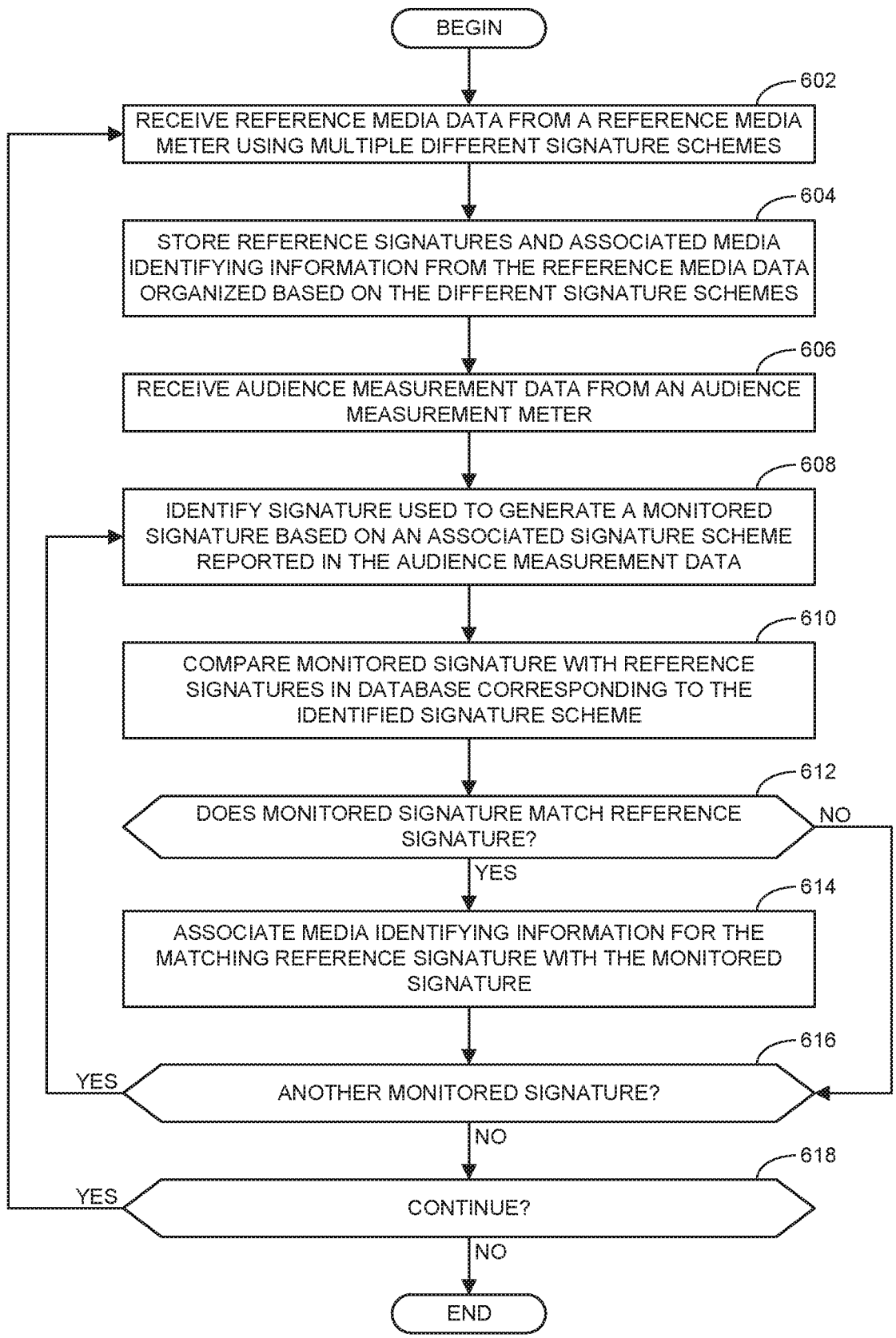
FIG. 6 is a flowchart representative of example machine readable instructions that may be executed to implement the data collection facility of FIGS. 1 and/or 3.

Flowcharts representative of example hardware logic, machine readable instructions, hardware implemented state machines, and/or any combination thereof for implementing the audience measurement meter 114 of FIGS. 1 and/or 2 is shown in FIGS. 4 and 5. Further, a flowchart representative of example hardware logic, machine readable instructions, hardware implemented state machines, and/or any combination thereof for implementing the data collection facility 118 of FIGS. 1 and/or 3 is shown in FIG. 6. The machine readable instructions may be an executable program or portion of an executable program for execution by a computer processor such as the processors 712, 812 shown in the example processor platforms 700, 800 discussed below in connection with FIGS. 7 and 8. The programs may be embodied in software stored on a non-transitory computer readable storage medium such as a CD-ROM, a floppy disk, a hard drive, a DVD, a Blu-ray disk, or a memory associated with the processor 712, 812, but the entire program and/or parts thereof could alternatively be executed by a device other than the processor 712, 812 and/or embodied in firmware or dedicated hardware. Further, although the example programs are described with reference to the flowcharts illustrated in FIGS. 4-6, many other methods of implementing the example audience measurement meter 114 and/or the example data collection facility 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Turning in detail to the flowcharts, FIG. 4 represents example machine readable instructions that may be executed to implement the audience measurement meter 114 of FIGS. 1 and/or 2. The program of FIG. 4 begins at block 402 where the example media detector 202 monitors audio associated with media to be monitored. At block 404, the example media environment analyzer 204 and/or the example media content analyzer 206 detect circumstances associated with the media based on the audio. For example, the media environment analyzer 204 may detect the circumstances of the surrounding environment such as, for example, the level of background noise to the audio stream of the media. The media content analyzer 206 may detect characteristics of the media itself. In some examples, the media content analyzer 206 uses such media characteristics to characterize the media as corresponding to a particular genre or type of media content.

At block 406, the example media environment analyzer 204 and/or the example media content analyzer 206 determines whether the detected circumstance associated with the media has changed. If so, at block 408, the example signature scheme selector 208 selects a signature scheme adapted or otherwise customized to the newly detected circumstance. Thereafter, at block 410, the example signature generator 212 generates a monitored signature from the media using the currently selected signature scheme (e.g., selected at block 408). Returning to block 406, if the detected circumstance associated with the media has not changed (e.g., after at least one iteration of the example process without a change), control advances directly to block 410.

At block 412, the example signature generator 212 generates a scheme identifier for the monitored signature. The scheme identifier serves to identify the signature scheme used to generate the associated monitored signature. At block 414, the communications interface 214 determines whether to transmit audience measurement data to the data collection facility 118. In some examples, audience measurement data is transmitted as soon as it is created. In other examples, audience measurement data may be aggregated over time and then transmitted at periodic or aperiodic intervals. That is, in some examples, each monitored signature may be independently reported to the data collection facility 118. In other examples, multiple monitored signatures may be collected and communicated to the data collection facility 118 in a single transmission. Thus, if the communications interface 214 determines to transmit the audience measurement data (block 414), control advances to block 416 where the communications interface 214 transmits the monitored signature along with the scheme identifier. If the communications interface 214 determine not to transmit the audience measurement data (block 414), block 416 is skipped. At block 418, the example audience measurement meter 114 determines whether to continue. If so, control returns to block 402 to repeat the process. Otherwise, the example process of FIG. 4 ends.

FIG. 5 represents example machine readable instructions that may be executed to implement the audience measurement meter 114 of FIGS. 1 and/or 2. The program of FIG. 5 begins at block 502 where the example media detector 202 monitors audio associated with media to be monitored. At block 504, the example media content analyzer 206 determines whether watermarks are embedded in the media. If so, at block 506, the example media environment analyzer 204 calculates the level of background noise based on the watermarks. Thereafter, the example media environment analyzer 204 isolates the audio stream of the media from the background noise before advancing to block 512. Returning to block 504, if the example media content analyzer 206 determines there are no watermarks embedded in the media, control advances to block 510 where the example media environment analyzer 204 estimates the level of background noise without the watermarks. In some examples, without the deterministic input of embedded watermarks, it may not be possible to isolate the audio stream of the media from background noise. Accordingly, control advances directly block 512 after estimating the level of background noise at block 510.

At block 512, the example media environment analyzer 204 determines whether the level of background noise exceeds a noise threshold. If so, control advances to block 514 where the example media content analyzer 206 characterizes the audio stream. Thereafter, at block 516, the example signature scheme selector 208 selects a signature scheme for a high noise environment based on the characterization. As outlined above, the audio stream may be isolated from background noise (block 508) if watermarks were included in the media or may not be isolated from the background noise. In either case, the example media content analyzer 206 characterizes the audio stream by identifying one or more characteristics associated with the audio being monitored to facilitate the selection of the signature scheme. While the characterization of the isolated audio stream is likely to be more accurate, it is expected that the characterization of the non-isolated audio stream will still facilitate the selection of a signature scheme under most circumstances. Once the signature scheme is selected (block 516), control advances to block 522 where the example signature generator 212 generates a signature from the media using the selected signature scheme.

Returning to block 512, if the level of background noise does not exceed the threshold, control advances to block 518 where the example media content analyzer 206 characterizes the audio stream. As with block 514, the characterization of the audio stream at block 518 may be based on the isolated audio stream or the non-isolated audio stream. At block 520, the example signature scheme selector 208 selects a signature scheme for a low noise environment based on the characterization. Thereafter, control advances to block 522 to generate a signature from the media using the selected signature scheme.

At block 524, the example signature generator 212 generates a scheme identifier for the signature. The scheme identifier serves to identify the signature scheme used to generate the associated signature. At block 526, the communications interface 214 determines whether to transmit audience measurement data to the data collection facility 118. If so, control advances to block 528 where the communications interface 214 transmits the signature along with the scheme identifier. If the communications interface 214 determines not to transmit the audience measurement data (block 526), block 528 is skipped. At block 530, the example audience measurement meter 114 determines whether to continue. If so, control returns to block 502 to repeat the process. Otherwise, the example process of FIG. 5 ends.

FIG. 6 represents example machine readable instructions that may be executed to implement the data collection facility 118 of FIGS. 1 and/or 3. The program of FIG. 6 begins at block 602 where the example communications interface 302 receives reference media data from the reference generator 112 collected using multiple different signature schemes. At block 604, the example reference signature database 306 stores reference signatures and associated media identifying information from the reference media data organized based on the different signature schemes. At block 606, the example communications interface 302 receives audience measurement data from an audience measurement meter 114. The audience measurement data includes monitored signatures and associated scheme identifiers.

At block 608, the example monitored signature analyzer 308 identifies signature scheme used to generate a monitored signature based on an associated scheme identifier reported in the audience measurement data. At block 610, the example signature comparator 310 compares the monitored signature to reference signatures corresponding to the identified signature scheme. At block 612, the example signature comparator 310 determines whether the monitored signature matches a reference signature. If so, at block 614, the monitored signature analyzer 308 associates the media identifying information for the matching reference signature with the monitored signature. If there is no match at block 612, block 614 is skipped. At block 616, the monitored signature analyzer 308 determines whether there is another monitored signature. If so, control returns to block 608. Otherwise, control advances to block 618 where the data collection facility 118 determines whether to continue. If so, control returns to block 602. Otherwise, the example process of FIG. 6 ends.

Figure 7:
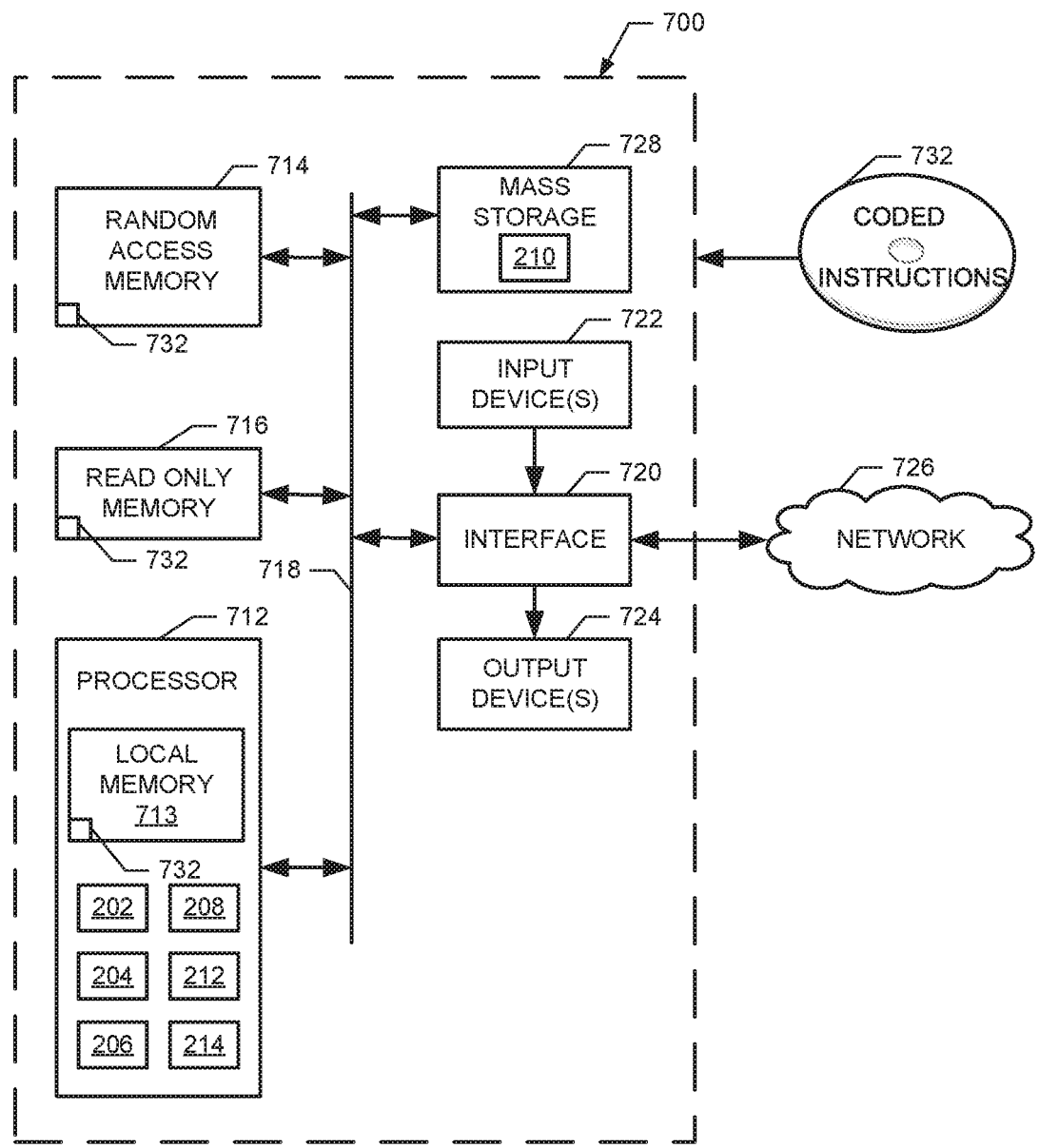
FIG. 7 is a block diagram of an example processor platform structured to execute the instructions of FIGS. 4 and/or 5 to implement the audience measurement meter of FIGS. 1 and/or 2.

FIG. 7 is a block diagram of an example processor platform 700 structured to execute the instructions of FIGS. 4 and/or 5 to implement the audience measurement meter 114 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media detector 202, the example media environment analyzer 204, the example media content analyzer 206, the example signature scheme selector 208, the example signature generator 212, and the example communications interface 214.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the mass storage devices 728 implements the example signature scheme database 210.

The machine executable instructions 732 of FIGS. 4 and/or 5 may be stored in the mass storage device 728, in the volatile memory 714, in the non-volatile memory 716, and/or on a removable non-transitory computer readable storage medium such as a CD or DVD.

Figure 8:
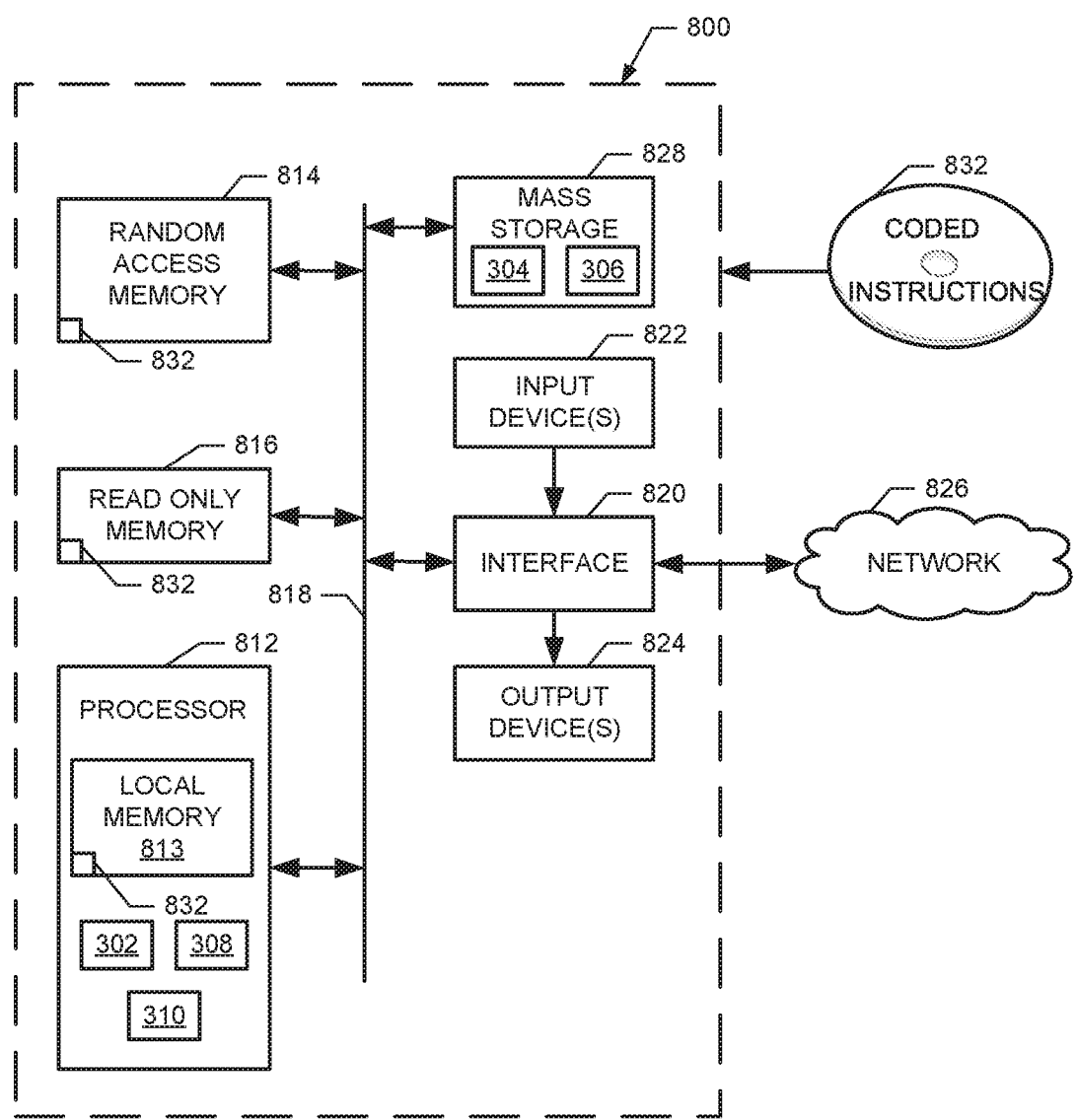
FIG. 8 is a block diagram of an example processor platform structured to execute the instructions of FIG. 6 to implement the data collection facility of FIGS. 1 and/or 3.

FIG. 8 is a block diagram of an example processor platform 800 structured to execute the instructions of FIG. 6 to implement the data collection facility 118 of FIGS. 1 and/or 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications interface 302, the example monitored signature analyzer 308, and the example signature comparator 310.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In this example, the mass storage devices 828 implements the example audience measurement database 304, and the example reference signature database 306.

The machine executable instructions 832 of FIG. 6 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable the collection of monitored signatures by audience measurement meters that can be matched with corresponding references signatures with a relatively high degree of confidence. Reliable monitored signatures are generated in accordance with teachings disclosed herein by controlling the operation of the audience measurement meter while generating the signatures based on the circumstances associated with the media from which the signatures are being taken. More particularly, the audience measurement meter selects and applies a particular signature scheme (from a plurality of available schemes) that is adapted to the currently detected circumstances (including environmental conditions and/or content characteristics) of the monitored media. Dynamically selecting different signature schemes that are specifically tailored to or otherwise yield a desired quality under different circumstances ensures that quality signatures are collected regardless of the situation. What is more, some disclosed examples further improve upon existing systems by reducing processing requirements because only a single selected signature scheme needs to be used at any particular time and the selected scheme may be tailored with a payload that is no greater than needed to achieve the desired level of confidence in matching to reference signatures.

Example 1 includes an apparatus comprising a signature scheme selector to select a first signature scheme from among a plurality of signature schemes to generate monitored signatures for media being monitored by a meter, the first signature scheme selected based on a circumstance associated with the media, a signal generator to generate a first monitored signature from the media based on the first signature scheme, and a communications interface to transmit the first monitored signature to a data collection facility.

Example 2 includes the apparatus as defined in example 1, wherein the circumstance is based on an environmental condition associated with the media.

Example 3 includes the apparatus as defined in example 2, wherein the environmental condition corresponds to an amount of background noise in an environment in which the media is monitored by the meter, the circumstance corresponding to a first circumstance when the amount of background noise is above a threshold, the circumstance corresponding to a second circumstance when the amount of background noise is below the threshold.

Example 4 includes the apparatus as defined in example 3, further including a media content analyzer to detect watermarks encoded in the media, and a media environment analyzer to determine the amount of background noise based on the watermarks.

Example 5 includes the apparatus as defined in any one of examples 1-4, wherein the circumstance corresponds to a characteristic of an audio stream of the media.

Example 6 includes the apparatus as defined in example 5, further including a media content analyzer to measure signal energy of the audio stream of the media, wherein the circumstance corresponds to a first circumstance when a majority of the signal energy is in a first frequency range, and the circumstance corresponds to a second circumstance when a majority of the signal energy is in a second frequency range, the second frequency range being higher than the first frequency range.

Example 7 includes the apparatus as defined in any one of examples 5 or 6, further including a media content analyzer to determine a genre of the media, wherein the circumstance corresponds to a first circumstance when the genre of the media is determined to be speech, and the circumstance corresponds to a second circumstance when the genre of the media is determined to be music.

Example 8 includes the apparatus as defined in any one of examples 1-7, wherein the signal generator generates a scheme identifier in connection with the first monitored signature, the scheme identifier indicating the first signature scheme was used to generate the first monitored signature.

Example 9 includes the apparatus as defined in any one of examples 1-8, wherein the signature scheme selector is to select a second signature scheme from among the plurality of signature schemes based on a change in the circumstance associated with the media, the signal generator to generate a second monitored signature from the media based on the second signature scheme, the communications interface to transmit the second monitored signature to the data collection facility.

Example 10 includes the apparatus as defined in example 9, wherein the second signature scheme is not used when the first monitored signature is generated, and the first signature scheme is not used when the second monitored signature is generated.

Example 11 includes a non-transitory computer readable medium comprising instructions that, when executed, cause an audience measurement meter to at least select a first signature scheme from among a plurality of signature schemes to generate monitored signatures for media being monitored by the audience measurement meter, the first signature scheme selected based on a circumstance associated with the media, generate a first monitored signature from the media based on the first signature scheme, and transmit the first monitored signature to a data collection facility.

Example 12 includes the non-transitory computer readable medium as defined in example 11, wherein the instructions further cause the audience measurement meter to detect an amount of background noise in an environment in which the media is monitored by the audience measurement meter, and determine the circumstance based on the amount of background noise.

Example 13 includes the non-transitory computer readable medium as defined in example 12, wherein the instructions further cause the audience measurement meter to detect watermarks encoded in the media, and determine the amount of background noise based on the watermarks.

Example 14 includes the non-transitory computer readable medium as defined in any one of examples 11-13, wherein the instructions further cause the audience measurement meter to determining a characteristic of an audio stream of the media, and determining the circumstance based on the characteristic.

Example 15 includes the non-transitory computer readable medium as defined in example 14, wherein the characteristic corresponds to a frequency range containing a majority of signal energy of the audio stream.

Example 16 includes the non-transitory computer readable medium as defined in any one of examples 11-15, wherein the instructions further cause the audience measurement meter to generate a scheme identifier in connection with the first monitored signature, the scheme identifier indicating the first signature scheme was used to generate the first monitored signature.

Example 17 includes the non-transitory computer readable medium as defined in any one of examples 11-16, wherein the instructions further cause the audience measurement meter to generate the first monitored signature based on the first signature scheme without implementing other ones of the plurality of signature schemes.

Example 18 includes a method comprising selecting, by executing an instruction with a processor of a meter, a first signature scheme from among a plurality of signature schemes to generate monitored signatures for media being monitored by the meter, the first signature scheme selected based on a circumstance associated with the media, generating, by executing an instruction with the processor, a first monitored signature from the media based on the first signature scheme, and transmitting, by executing an instruction with the processor, the first monitored signature to a data collection facility.

Example 19 includes the method as defined in example 18, further including detecting an amount of background noise in an environment in which the media is monitored by the meter, and determining the circumstance based on the amount of background noise.

Example 20 includes the method as defined in any one of examples 18 or 19, further including determining a characteristic of an audio stream of the media, and determining the circumstance based on the characteristic.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a signature scheme selector to select a first signature scheme from among a plurality of signature schemes to generate monitored signatures for media being monitored by a meter, the first signature scheme selected based on a circumstance associated with the media;
a signature generator to:
generate a first monitored signature from the media based on the first signature scheme; and
generate a scheme identifier in connection with the first monitored signature, the scheme identifier to specify that the first signature scheme was used to generate the first monitored signature, the scheme identifier including a first numeric identifier and a second numeric identifier, the first numeric identifier to identify the first signature scheme, the second numeric identifier to identify a configuration of the first signature scheme; and a communications interface to transmit the first monitored signature and the scheme identifier to a data collection facility.

2. The apparatus as defined in claim 1, wherein the circumstance is based on an environmental condition associated with the media.

3. The apparatus as defined in claim 2, wherein the environmental condition corresponds to an amount of background noise in an environment in which the media is monitored by the meter, the circumstance corresponding to a first circumstance when the amount of background noise is above a threshold, the circumstance corresponding to a second circumstance when the amount of background noise is below the threshold.

4. The apparatus as defined in claim 3, further including:
a media content analyzer to detect watermarks encoded in the media; and
a media environment analyzer to determine the amount of background noise based on the watermarks.

5. The apparatus as defined in claim 1, wherein the circumstance corresponds to a characteristic of an audio stream of the media.

6. The apparatus as defined in claim 5, further including a media content analyzer to measure signal energy of the audio stream of the media, wherein the circumstance corresponds to a first circumstance when a majority of the signal energy is in a first frequency range, and the circumstance corresponds to a second circumstance when a majority of the signal energy is in a second frequency range, the second frequency range being higher than the first frequency range.

7. The apparatus as defined in claim 5, further including a media content analyzer to determine a genre of the media, wherein the circumstance corresponds to a first circumstance when the genre of the media is determined to be speech, and the circumstance corresponds to a second circumstance when the genre of the media is determined to be music.

8. The apparatus as defined in claim 1, wherein the signature scheme selector is to select a second signature scheme from among the plurality of signature schemes based on a change in the circumstance associated with the media, the signature generator to generate a second monitored signature from the media based on the second signature scheme, the communications interface to transmit the second monitored signature to the data collection facility.

9. The apparatus as defined in claim 8, wherein the second signature scheme is not used when the first monitored signature is generated, and the first signature scheme is not used when the second monitored signature is generated.

10. A non-transitory computer readable medium comprising instructions that, when executed, cause an audience measurement meter to at least:
select a first signature scheme from among a plurality of signature schemes to generate monitored signatures for media being monitored by the audience measurement meter, the first signature scheme selected based on a circumstance associated with the media;
generate a first monitored signature from the media based on the first signature scheme;
generate a scheme identifier in connection with the first monitored signature, the scheme identifier to specify that the first signature scheme was used to generate the first monitored signature, the scheme identifier including a first numeric identifier and a second numeric identifier, the first numeric identifier to identify the first signature scheme, the second numeric identifier to identify a configuration of the first signature scheme; and
transmit the first monitored signature and the scheme identifier to a data collection facility.

11. The non-transitory computer readable medium as defined in claim 10, wherein the instructions further cause the audience measurement meter to:
detect an amount of background noise in an environment in which the media is monitored by the audience measurement meter; and
determine the circumstance based on the amount of background noise.

12. The non-transitory computer readable medium as defined in claim 11, wherein the instructions further cause the audience measurement meter to:
detect watermarks encoded in the media; and
determine the amount of background noise based on the watermarks.

13. The non-transitory computer readable medium as defined in claim 10, wherein the instructions further cause the audience measurement meter to:
determine a characteristic of an audio stream of the media; and
determine the circumstance based on the characteristic.

14. The non-transitory computer readable medium as defined in claim 13, wherein the characteristic corresponds to a frequency range containing a majority of signal energy of the audio stream.

15. The non-transitory computer readable medium as defined in claim 10, wherein the instructions further cause the audience measurement meter to generate the first monitored signature based on the first signature scheme without implementing other ones of the plurality of signature schemes.

16. A method comprising:
selecting, by executing an instruction with a processor of a meter, a first signature scheme from among a plurality of signature schemes to generate monitored signatures for media being monitored by the meter, the first signature scheme selected based on a circumstance associated with the media;
generating, by executing an instruction with the processor, a first monitored signature from the media based on the first signature scheme;
generating, by executing an instruction with the processor, a scheme identifier in connection with the first monitored signature, the scheme identifier specifying that the first signature scheme was used to generate the first monitored signature, the scheme identifier including a first numeric identifier and a second numeric identifier, the first numeric identifier to identify the first signature scheme, the second numeric identifier to identify a configuration of the first signature scheme; and
transmitting, by executing an instruction with the processor, the first monitored signature and the scheme identifier to a data collection facility.

17. The method as defined in claim 16, further including:
detecting an amount of background noise in an environment in which the media is monitored by the meter; and
determining the circumstance based on the amount of background noise.

18. The method as defined in claim 16, further including:

determining a characteristic of an audio stream of the media; and determining the circumstance based on the characteristic.

19. An apparatus comprising:

a media content analyzer to detect a watermark encoded in media monitored by a meter;

a media environment analyzer to:

identify a baseline noise for the media based on the watermark; and estimate an amount of background noise in an environment in which the media is monitored by the meter, the amount of background noise estimated based on the baseline noise for the media;

a signature scheme selector to select a first signature scheme from among a plurality of signature schemes to generate monitored signatures for the media, the first signature scheme selected based on the amount of background noise;

a signature generator to:

generate a first monitored signature from the media based on the first signature scheme; and generate a scheme identifier in connection with the first monitored signature, the scheme identifier to specify that the first signature scheme was used to generate the first monitored signature; and a communications interface to transmit the first monitored signature and the scheme identifier to a data collection facility.

\* \* \* \* \*